United States Patent [19]

Oshnock et al.

[11] Patent Number: 5,173,017
[45] Date of Patent: Dec. 22, 1992

[54] APPARATUS TO ADAPT A TOOLHOLDER FOR MOUNTING TO A BASE MEMBER

[75] Inventors: Robert E. Oshnock; Robert A. Erickson, both of Raleigh, N.C.

[73] Assignee: Kennametal Inc., Latrobe, Pa.

[21] Appl. No.: 811,561

[22] Filed: Dec. 20, 1991

[51] Int. Cl.5 .............................................. B23B 31/02
[52] U.S. Cl. ...................... 409/234; 82/160; 279/2.23; 408/240
[58] Field of Search ............. 409/232, 233, 234; 82/158, 160; 408/238, 239 R, 240; 279/2.11, 2.23, 8, 75

[56] References Cited

U.S. PATENT DOCUMENTS

| | | |
|---|---|---|
| 4,270,422 | 6/1981 | Andersson . |
| 4,557,642 | 12/1985 | Dudas et al. ........................ 279/8 |
| 4,655,655 | 4/1987 | Schürfeld . |
| 4,708,040 | 11/1987 | Erickson . |
| 4,723,877 | 2/1988 | Erickson ........................... 82/160 |
| 4,747,735 | 5/1988 | Erickson et al. . |
| 4,799,838 | 1/1989 | Kubo et al. ......................... 279/8 |
| 4,981,057 | 1/1991 | von Haas et al. . |
| 5,035,557 | 7/1991 | Kohlbauer et al. ............. 409/233 |
| 5,054,344 | 10/1991 | Erickson et al. ................. 409/233 |

Primary Examiner—Daniel W. Howell
Attorney, Agent, or Firm—James G. Porcelli

[57] ABSTRACT

An apparatus for adapting toolholders (10) which are specifically designed for use with machine tools having quick change tooling systems so that such toolholders may be used with machine tools not equipped with such systems. The apparatus secures to the toolholder shank (45) and provides an intermediate element enabling the toolholder (10) to be secured to such machine tools.

18 Claims, 8 Drawing Sheets

APPARATUS TO ADAPT A TOOLHOLDER FOR MOUNTING TO A BASE MEMBER

BACKGROUND OF THE INVENTION

The present invention relates to an apparatus for securing a toolholder within a base and more specifically relates to an adaptor for securing a quick change toolholder to a conventional base.

As an overview, metalworking operations are typically performed using a cutting insert of a hard metal. Such an insert is mounted to a toolholder. The toolholder is secured either temporarily or permanently to a base member which is part of a machine such as a lathe or a milling machine.

Because of the extreme conditions under which they operate, cutting inserts must be replaced on a regular basis. In order to do this the cutting insert must be removed from the toolholder. The economies of the metalworking operation make it inefficient to shut a machine down for the length of time required to replace a cutting insert on a toolholder. It is more desirable to utilize a removeable toolholder such that the entire toolholder with the accompanying cutting insert may be removed and replaced with another toolholder having a new cutting insert already in position on the toolholder.

With this in mind the focus for efficiency then becomes the ease and the speed with which the toolholder may be replaced. This has been one of the motivating factors producing different commercial designs for quick change toolholders.

One example of such a design may be found in U.S. Pat. No. 4,747,735 entitled "Toolholder and Method of Releasably Mounting" by Erickson et al, which is assigned to the applicant of the subject invention and which is hereby incorporated by reference.

The details of this patent, which are prior art, are shown in FIGS. 1 and 2 and will be used to provide an overview of the design for quick change toolholders.

Looking at FIG. 1, on a toolholder 10 having a forward end 15 a cutting insert 20 is mounted. The cutting insert 20 is spaced from the toolholder 10 by a shim 25, and both the cutting insert 20 and shim 25 are held to the toolholder by means such as a clamp 30 which is secured to the toolholder 10 by a pin 35. The toolholder 10 has a rearwardly facing abutment face 40 along with a tubular shank 45 extending rearwardly from the forward end 15 and has a shank wall 50. The toolholder 10 may have a slot 53 within the shank wall 50 and spaced perforations 55 in the shank wall 50. The toolholder 10 may have forwardly facing concave contact surfaces 60 within the perforations 55.

The toolholder is positioned about a longitudinal axis 56 and this axis 56 will be used as a reference throughout this specification. As evidenced by the drawings, many features discussed in the specification are symmetric about the longitudinal axis 56. For that reason, oftentimes throughout this discussion reference will be made to a single item with the understanding that such discussion will also apply to the other duplicate items.

A toolholder receiving member 65 having a forwardly facing abutment face 67 and an opening 70 along the longitudinal axis 56 is secured to a base member 75.

The base member 75 may be any of a large variety of anchors to which toolholders may be attached. One such example is the turret of a turret lathe.

Within a cylindrical passageway 80 in the base member 75 is a stub 85 which also extends into the opening 70 of the toolholder receiving member 65. A bore 90 extends longitudinally through the stub 85 and a locking rod 95 is slidably mounted within the bore 90.

Toward the forward end 97 of the locking rod 95 are depressions 100 in the rod which may be aligned with radial apertures 105 extending through the stub 85. The locking rod 95 may be moved along the longitudinal axis 56 by pulling or pushing on the locking rod base 110 which is attached to the locking rod 95. Locking elements 115 positioned within the apertures 105 of the stub 85 and within the depressions 100 of the locking rod 95 may be urged radially outwardly by moving the locking rod 95 away from the toolholder 10.

FIG. 1 shows the toolholder 10 removed from the toolholder receiving member 65. In order to secure the toolholder 10 within the toolholder receiving member 65, the locking rod 95 is positioned such that the locking elements 115 are within the depressions 100 and furthermore recessed within the radial apertures 105 such that the tubular shank 45 of the toolholder 10 may be inserted into the opening 70.

As shown in FIG. 2, with the toolholder 10 positioned within the opening 70, the locking rod 95 may be pulled in the direction of arrow 117 away from the toolholder 10 such that the locking elements 115 are displaced radially outwardly by the depressions 100 and the locking elements 115 penetrate the perforations 55 such that they contact the forwardly facing concave contact surfaces 60. When the locking rod 95 is retracted in the direction of arrow 117, the toolholder 10 is urged within the toolholder receiving member 65 and the rearwardly facing abutment face 40 of the toolholder 10 contacts the forwardly facing abutment surface 67 of the toolholder receiving member 65. This action of the locking rod 95 secures the toolholder 10 within the toolholder receiving member 65.

It should be noted in FIG. 2 that the locking elements 115 are protruding beyond the radial aperture 105 and urging the tubular shank wall 50 against the walls of the opening 70. For increased stiffness between the toolholder 10 and the toolholder receiving member 65, the locking rod 95 may be retracted further thereby causing the locking elements 115 to elastically deform a portion of the shank 45 until it contacts the walls of opening 70.

In order to provide still higher stiffness between the toolholder 10 and the toolholder receiving member 65, the tubular shank 45 may be sized relative to the opening 70 such that upon insertion of the toolholder 10 into the opening 70, there exists an interference fit and elastic deflection occurs between the shank 45 and the toolholder receiving member 65 in the vicinity of the opening 70. In such a manner the toolholder 10 may be secured to the toolholder support member 65 with a high level of accuracy and repeatability.

In order to release the toolholder 10 from the toolholder receiving member 65, the locking rod 95 is urged toward the toolholder 10 in the direction of arrow 119. In such a manner the locking elements 115 are retracted within the radial aperture 105 and adequate clearance is provided so that the toolholder 10 may be removed from the toolholder receiving member 65.

However, given elastic deformation between the shank 45 of the toolholder 10 and the toolholder receiving member 65, there may exist high frictional forces retaining the toolholder 10 within the toolholder receiving member 65. To release the toolholder 10, the locking rod 95 is extended at the forward end of the toolholder receiving member 65 such that the locking rod 95 protrudes beyond the stub 80 and contacts an impact area 120 within the tubular shank 45 of the toolholder 10. In such a manner, continued urging of the locking rod 95 toward the toolholder 10 will force the locking rod 95 against the impact area 120 thereby ejecting the toolholder 10 from the toolholder receiving member 65.

It should now be appreciated that by urging the locking rod a toolholder may be secured or released within a toolholder receiving member, and as such the device shown in FIGS. 1 and 2 provides for quick changing of a toolholder.

It should further be appreciated that the forward end 15 of the toolholder 10 is not limited to the configurations shown in FIGS. 1 and 2 and may be adapted for any number of applications. For this reason, the forward end of a toolholder similar to toolholder 10 may have a large variety of configurations to provide an entire series of toolholders 10, each with a different purpose.

A unique situation arises when an individual is interested in utilizing the variety of available toolholders but is not interested in incorporating the quick change features contained within the toolholder receiving member 65 shown in FIGS. 1 and 2. For these instances there is a need to provide a way to utilize the toolholder 10 without a need to purchase the hardware necessary to provide these quick change features.

An object of this invention is to provide a relatively inexpensive means for adapting toolholders currently utilized in quick change mechanisms for use in conventional tooling machines.

Another object of the invention is to provide a relatively simple apparatus for adapting these toolholders for mounting to a conventional machine tool.

It is a further object of this invention to provide such an apparatus with the high stiffness available in commercial quick change mechanisms.

It is still another object of this invention to provide comparable dimensional accuracy for positioning the toolholder within the toolholder receiving members to that accuracy inherent in quick change mechanisms.

SUMMARY OF THE INVENTION

One embodiment of the invention is an apparatus to adapt a quick change toolholder for mounting to a base member not equipped to receive such a toolholder. The toolholder is designed for use with a quick release system and is comprised of a forward end for receiving a tool, a rearwardly facing abutment face, a tubular shank extending rearwardly away from said forward end and having a longitudinal axis. The shank is perforated by perforations at spaced locations. Within each perforation is a forwardly facing concave contact surface which extends forwardly while extending away from the inner surface of said tubular shank toward the outer surface of said tubular shank. At least one slot within the shank may be used to hold the toolholder nonrotatably.

The apparatus is comprised of an adapter canister, a locking element, a toolholder support member and a means for urging the canister into and out of the toolholder support member.

The adapter canister is capable of being inserted within the toolholder shank. The adapter canister has a forward end and a rearward end, depressions located upon the canister in positions corresponding to said perforations such that in the inserted position the depression are generally aligned with the shank perforations and a protruding key portion on the canister for engaging each slot within the shank when the adapter canister is inserted into the toolholder shank.

The locking element is positioned within each perforation and depression to provide a coupling and to provide rigidity along the longitudinal axis between the toolholder and adapter canister by capturing the locking elements between the respective depression and the toolholder forwardly facing concave contact surface when the adapter canister is urged away from the toolholder.

The toolholder support member has a forwardly facing abutment face for contact with the toolholder rearwardly facing abutment face and an opening extending rearwardly therefrom to receive the toolholder and adapter canister with the locking elements. The opening has an opening first portion to receive the shank, an opening second portion to receive and hold nonrotatably the adapter canister and an opening third portion from which toolholder and canister with the locking elements may be urged into the toolholder support member.

In a preferred embodiment the means for urging the canister into and out of the toolholder support member is a rod having forward and rearward ends with the forward end secured to the adapter canister. Such a rod may be threaded at both ends to engage threaded bores within the adapter canister and the toolholder support member.

BRIEF DESCRIPTION OF THE DRAWINGS

The foregoing and other aspects of the present invention will become more apparent upon review of the following detailed description of the invention in conjunction with the drawings which are briefly described below.

DETAILED DESCRIPTION OF THE INVENTION

Figure 2:
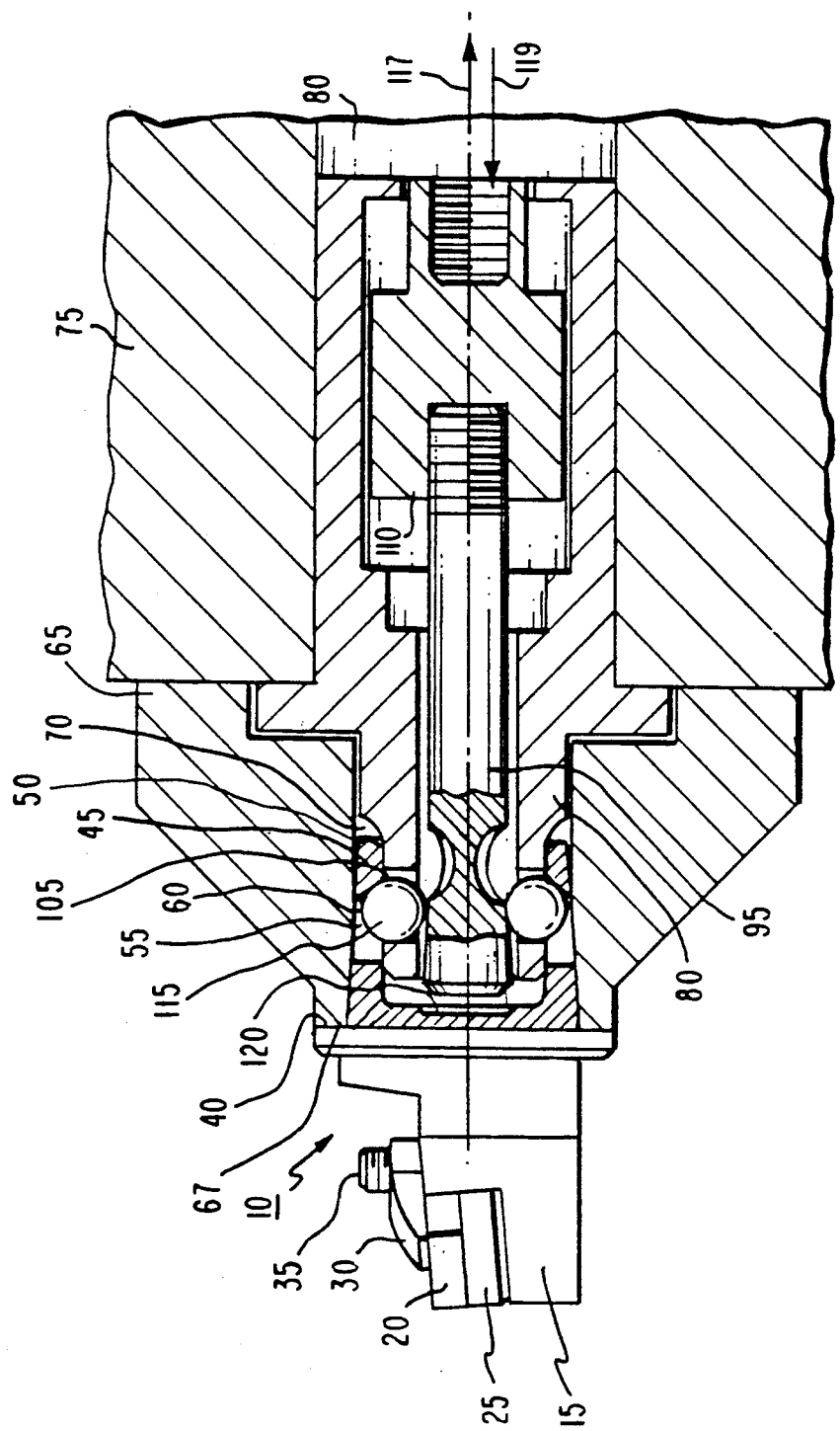
FIG. 2 is prior art and shows the quick change mechanism of FIG. 1 with the toolholder mounted within the toolholder receiving member.
Figure 3:
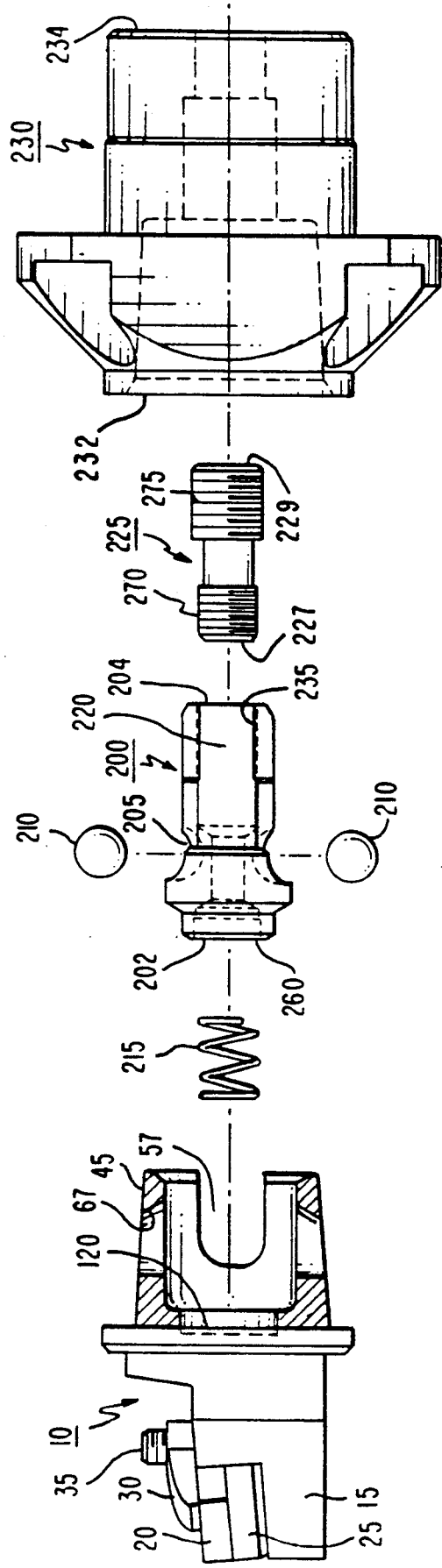
FIG. 3 shows an exploded view of the components in the adapter apparatus of this invention.

The elements of the subject invention are generally shown in FIG. 3. The toolholder 10 is identical to that toolholder discussed in the prior art and the items shown are identical to those previously discussed. However, unlike the stub 80 (FIGS. 1 and 2) which is secured to the toolholder receiving member 65, which in turn is secured to a base member 75, in FIG. 3, the toolholder 10 receives an adapter canister 200, having a forward end 202 and a rearward end 204. The adapter canister 200 has depressions 205 on opposing sides and is secured within the toolholder shank 45 by locking elements 210 acting to engage the forwardly facing concave contact surface 60 of the toolholder 10.

A spring 215 may be used to urge the adapter canister 200 away from the toolholder 10 thereby urging the locking elements 210 against the toolholder shank 45, however this is for convenience and the assembly of this invention will function properly without the spring 215.

Protruding key portions 220 extend from the adapter canister 200 to engage the shank slot 57 of the toolholder 10 and restrict rotation between the toolholder 10 and the adapter canister 200. A rod 225, with a forward end 227 and a rearward end 229 is secured to the adapter canister 200. The rod 225 is used to urge toolholder 10 into the toolholder support member 230, said toolholder support member 230 having a forward end 232 and a rearward end 234, thereby providing an arrangement similar to FIG. 6, which will be discussed.

Figure 1:
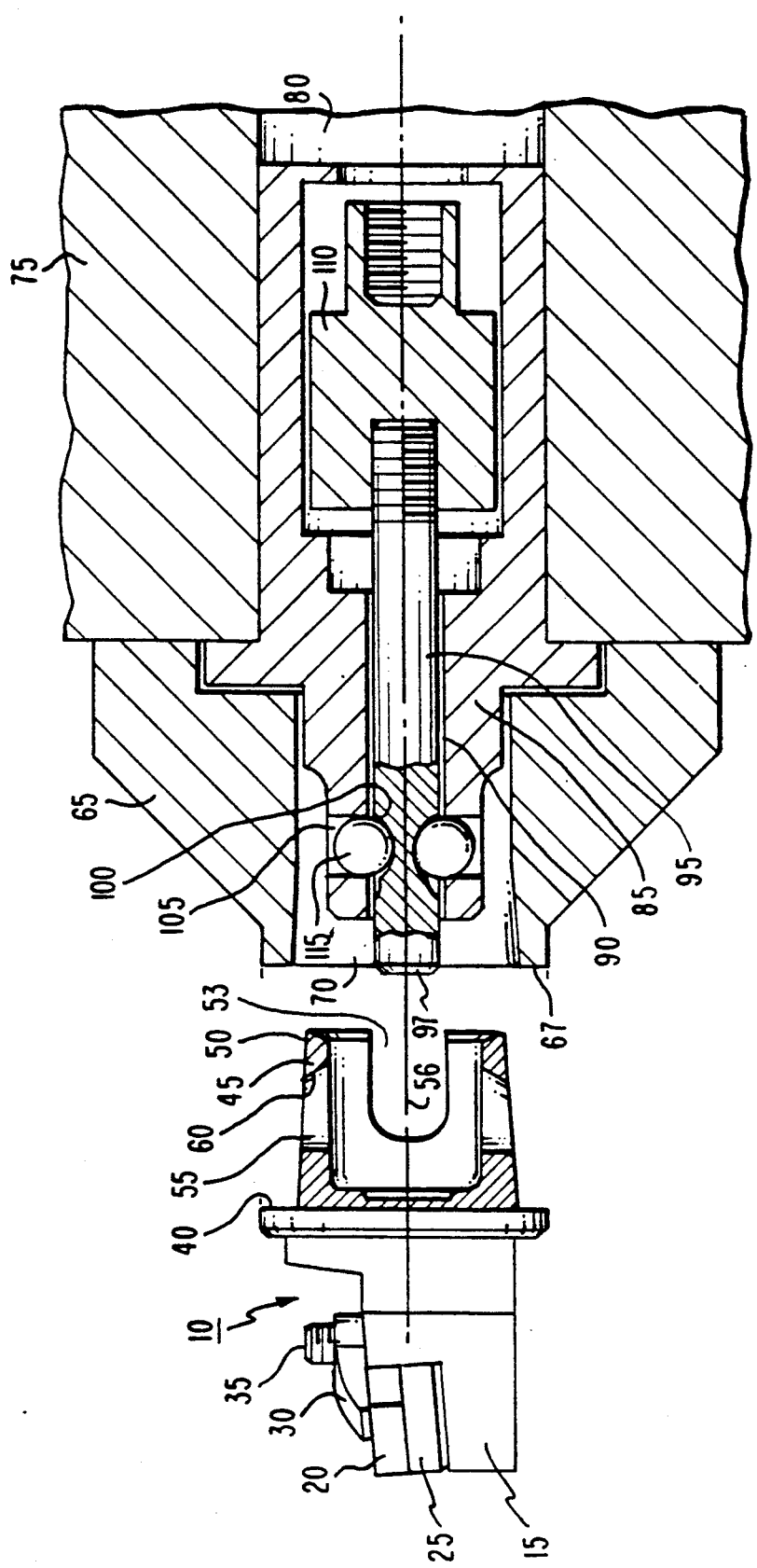
FIG. 1 is prior art and shows a sectional side view of a commercially available quick change mechanism with the toolholder removed.

The adapter canister 200 (FIG. 3), locking elements 210, spring 215, rod 225 and toolholder support member 230 are elements that may be used to secure the toolholder 10 to a conventional machine tool base member, such as item 75 shown in FIGS. 1 and 2.

Figure 4:
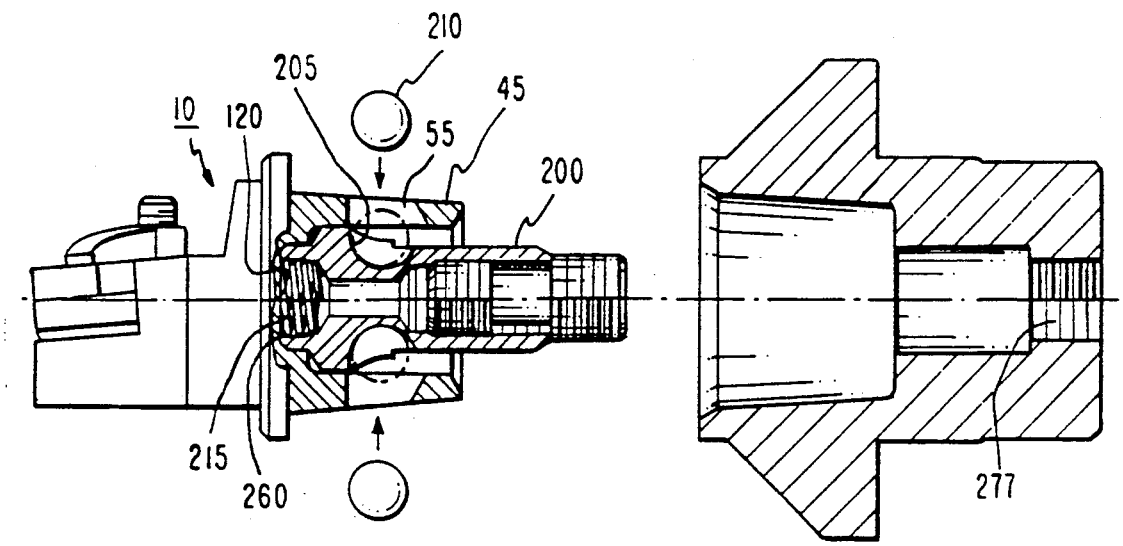
FIG. 4 shows a partial sectional side view of the adapter apparatus in the present invention with the toolholder disconnected from the toolholder support member and the canister positioned so that the balls may be inserted within the apertures.
Figure 5:
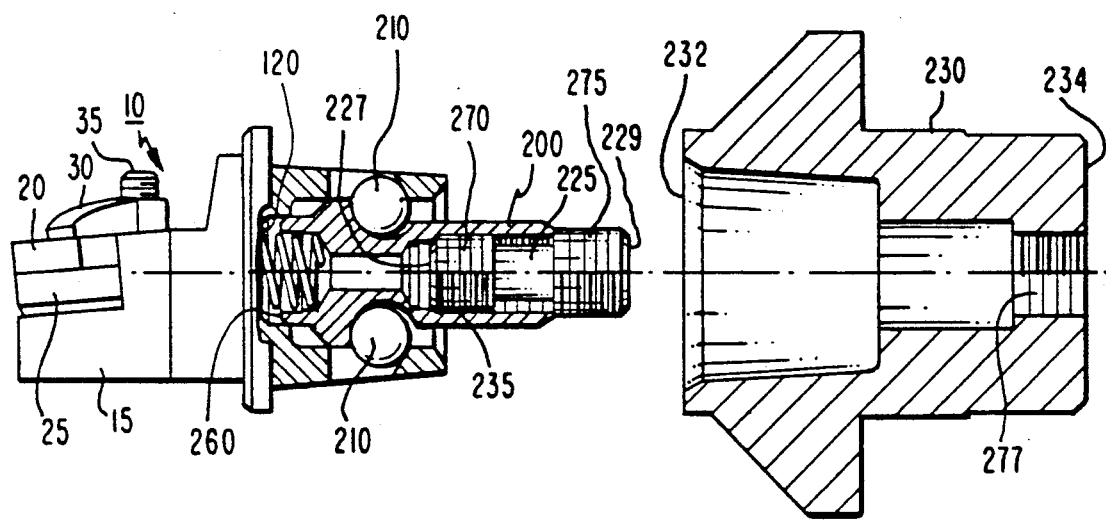
FIG. 5 shows a partial sectional side view of the adapter apparatus in the present invention with the toolholder disconnected from the toolholder support member and the canister positioned so that the locking elements are secured between the canister and the toolholder shank.
Figure 6:
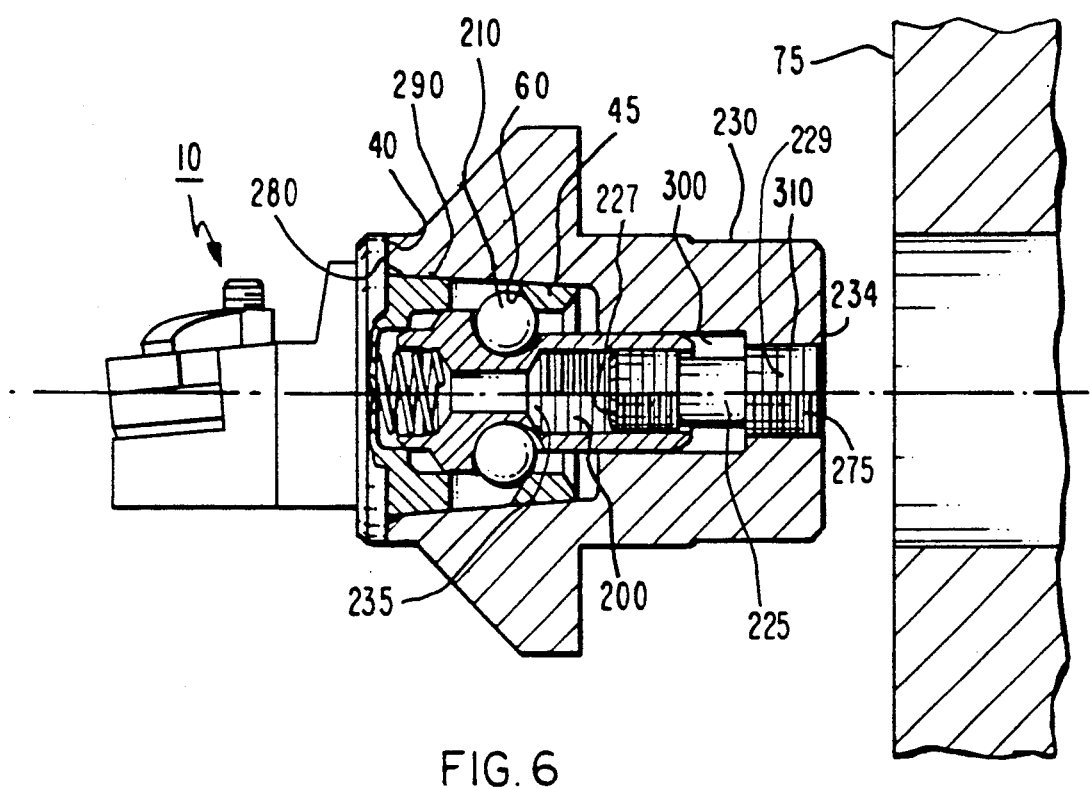
FIG. 6 shows a partial sectional side view of the adapter apparatus of the present invention with the toolholder secured to the toolholder support member.
Figure 7C:
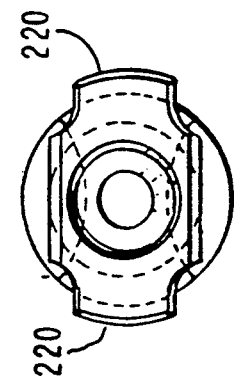
FIGS. 7(A)–7(D) show an elevation, top, left side and right side view respectively of details of the adapter canister in this invention.
Figure 7B:
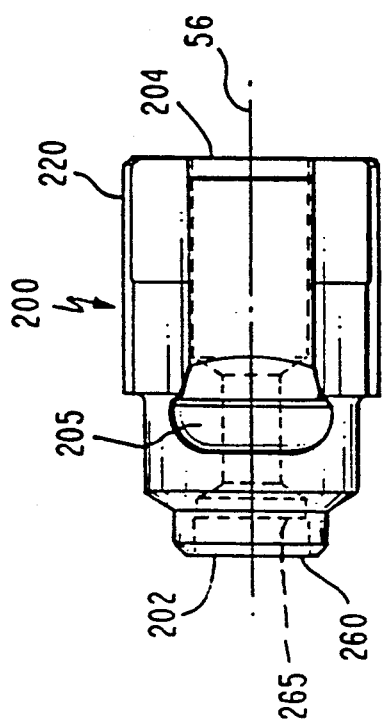
Figure 7A:
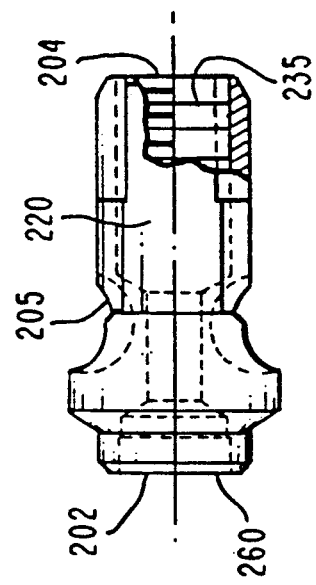
Figure 7D:
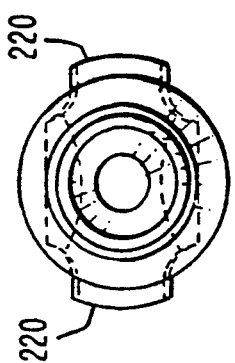

FIGS. 4-6 will show how these elements interact for this result. In FIG. 4 the adapter canister 200 is inserted within the shank 45 of the toolholder 10.

At this point, brief attention should be given to FIGS. 7A-7D to highlight features of the adapter canister 200. As mentioned earlier, the canister has a forward end 202 and a rearward end 204 and is generally rectangular in shape and oriented along the longitudinal axis 56. On opposing sides of the canister 200 are depressions 205 which may have a spherical contour to accept the locking elements 210 (FIG. 3) which may be spherical. Protruding key portions 220 extend from the sides of the canister 200 such that the canister protruding key portions 220 engage the toolholder slot 57 (FIG. 3) when the canister 200 is inserted within the toolholder 10. As will be explained, the canister protruding key portions 220 will also engage a portion of the toolholder support member 230 (FIG. 3), thereby restraining rotation about the longitudinal axis 56 between the toolholder 10 and the tool support member 230.

The canister rearward end 204 must be acted upon to displace the canister along the longitudinal axis 56. For this reason, extending into canister 200 from the canister rearward end 204 may be a threaded bore 235 with threads of a specific pitch and threaded in a specific direction.

Finally, at the canister forward end 202 may be a canister bump-off 260. This feature, as will be seen, permits the canister to advance against the toolholder 10 to urge the toolholder 10 away from the toolholder support member 230 when the toolholder 10 is to be released. While the canister 200 is generally rectangular, the forward portion 202 is preferably cylindrical to be compatible with the cylindrical toolholder shank 45 (FIG. 3).

The canister 200 may also include a spring cavity 265 extending inwardly from the forward end 202 to accept a spring 215 (FIG. 3) for urging the canister 200 away from the toolholder 10.

Returning to FIG. 4, it is seen that the canister 200 is inserted within toolholder shank 45. The spring 215 is compressed between the toolholder 10 and canister 200. At this point, locking elements 210 may be inserted through the shank perforations 55 into the depressions 205.

It should be appreciated that the canister 200 in FIG. 4 is physically pushed into the shank 45 and absent such a force, the canister would be displaced from the toolholder 10 by the spring 215. With the locking elements 210 in the depressions 205, the cannister 200 moves away from the toolholder 10 until the locking elements 210 engage the shank forwardly facing concave contact surfaces 60.

FIG. 5 shows the canister 200 in such a position relative to the toolholder 10. With the canister 200 secured within the toolholder 10, this assembly may be secured within the toolholder support member 230. To accomplish this, a means for urging the canister into and out of the toolholder support member 230 is needed.

One such embodiment of this includes threads 270 within the rod forward end 227 (also see FIG. 3) which are compatible with those threads 235 within the canister 200. As seen, the rod 225 is threaded into the canister 200. The rod rearward end 229 also has threads 275 which do not engage the canister 200 but are threaded into a mating set of threads within the tool support member 230. By rotating the rod 225 to engage the toolholder support member 230, the toolholder 10 may be secured to the toolholder support member 230.

The threads 270 and 275 may be threaded in different directions so that rotation of the rod 225 will provide relative movement between the canister 200 and the toolholder support member 230.

However, in order to provide maximum mechanical advantage for generating a longitudinal force between the canister 200 and the toolholder support member 230, the threads 270 and 275 are preferably threaded in the same direction (i.e. both right-handed or left-handed threads) but have different pitches. For example, one set of threads may be right-handed and have a pitch of 0.125 inches per thread and another set of threads may also be right-handed and have a pitch of 0.250 inches per thread. In such a manner, every rotation of the rod 225 would cause relative motion between the canister 200 and the toolholder support member 230 of 0.125 inches.

For rotation, the rod 225 is accessible from the rearward end 234 of the toolholder support member 230 and may be rotated through, for example, a hexagonal bore within the rearward end 229 of the rod 225, using a device similar to an allen wrench. Alternatively, the rod 225 may be rotated using any number of conventional means, such as a variety of screw head configurations.

Figure 8C:
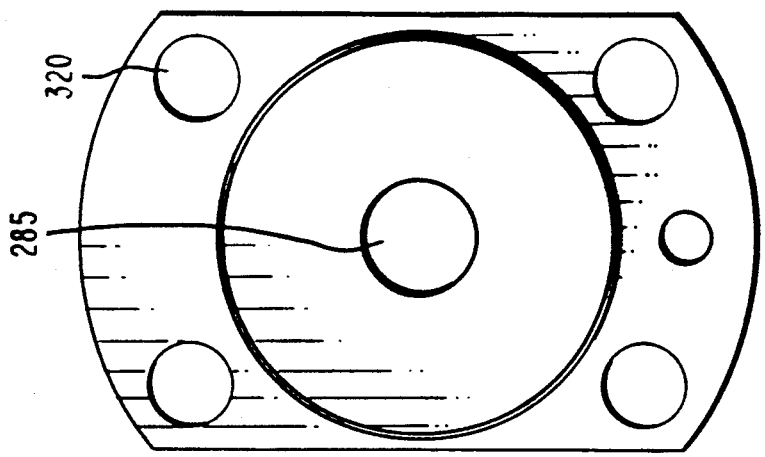
FIGS. 8(A)–(C) show an elevation, left side and right side view respectively of details of the toolholder support member of this invention.
Figure 8A:
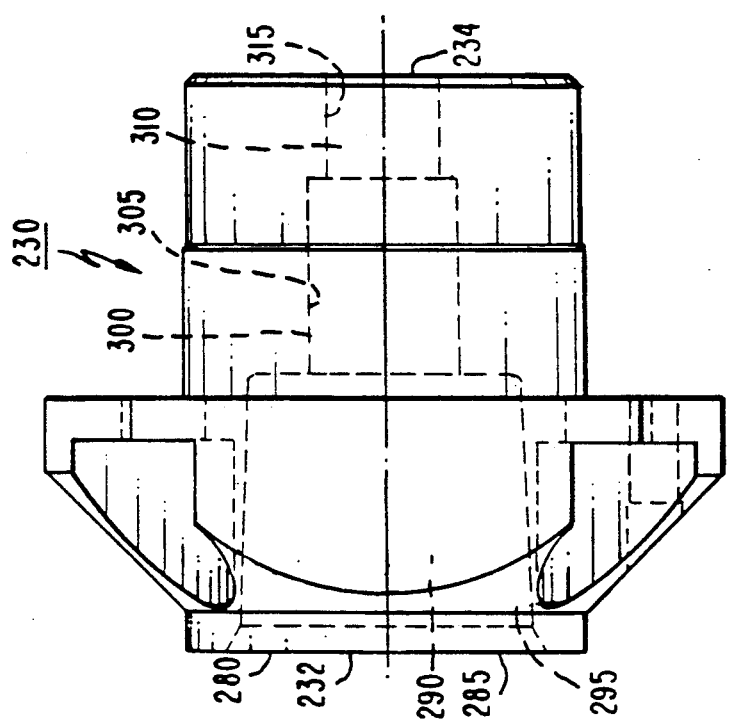
Figure 8B:
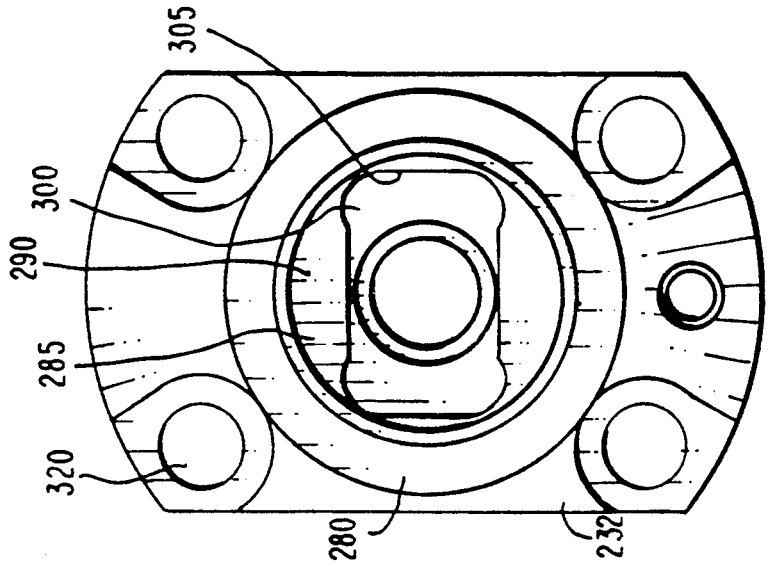

FIG. 6 shows the toolholder 10 secured to the toolholder support member 230. For an appreciation of FIG. 6, details of the toolholder support member 230 will be briefly discussed and attention should be directed toward FIGS. 8A–8C. The toolholder support member 230 is generally comprised of a forward end 232 and a rearward end 234. A forwardly facing abutment face 280 is defined at the forward end 232. Extending inwardly from the forward end 232 is an opening 285 to receive the toolholder 10 and the canister 200. The toolholder support member opening 285 is comprised of a first portion 290 with a bore 295 to receive the toolholder shank 45 (not shown), a second portion 300 with a bore 305 to receive and hold nonrotatably the canister 200 (not shown) and a third portion 310 with a bore 315 from which the toolholder 10 and canister 200 with locking elements 210 may be urged into the toolholder support member 230. The bore 295 of the opening first portion 290 is sized to accept the toolholder shank 45 and is preferably cylindrical. The bore 295 may be intentionally undersized to provide an interference fit between it and the shank 45. Essentially the bore may be identical to the opening 70 described with the prior art in FIGS. 1 and 2.

The bore 305 of the opening second portion 300 comprises a generally rectangular cross-section adapted to receive the adapter canister 200 with the protruding key portion 220. In this manner the toolholder 10 is held non-rotatably relative to the toolholder support member 230.

While the bore 305 has a generally rectangular cross-section, as long as the canister 200 is held non-rotatably within the toolholder support member 230, the bore 305 and canister 200 may be designed with any configuration that would restrict rotation, such as an oval or triangular configuration.

The bore 315 of the opening third portion 310 may be threaded (as shown by item 227 in FIG. 5) to accept the rod rearward end threads 275 (FIG. 5). The opening third portion 310 extends through the toolholder support member 230 so that access to the rod 225 is possible at the toolholder support member rearward end 234 (FIG. 5).

Returning to FIG. 6, using the preferred embodiment in which the rod forward end 227 and rod rearward end 229 are threaded at different pitches and in the same directions, the rod 225 is rotated into the canister threaded bore 235 as far as possible. This distance will be determined by the depth of the threaded bore 235.

Although not illustrated in a figure, at this point, the toolholder/canister assembly may be inserted into the toolholder support member 230 until the rod rearward end threads 275 are positioned to be engaged with the threaded bore 250. The rod 225 may be rotated to pull the canister 200 and toolholder 10, along with the locking elements 210, spring 215 and rod 225 into the toolholder support member 230. The toolholder may be urged into the toolholder support member 230 at least until the rearwardly facing abutment face 40 of the toolholder 10 contacts the forwardly facing abutment face 280 of the toolholder support member 230. This configurfation is illustrated in FIG. 6.

Further urging of the toolholder 10 may result in a radially outward force against the forwardly facing concave contact surface 60, causing the shank 45 to expand outwardly against the wall of the opening first portion 290. Also further urging of the toolholder 10 may result in a resilient interference fit between the shank 45 of the toolholder 10 and the toolholder support member opening first portion 290.

FIG. 6 also includes a base member 75 similar to that shown in FIGS. 1 and 2 into which the toolholder support member 230 may be anchored for use. The toolholder support member 230 may be secured to the base member 75 through conventional means such as bolts (not shown) through passages 320 (FIG. 8) in the toolholder support member 230 and through receiving holes (not shown) in the base member 75.

In order to release the toolholder 10 from the toolholder support member 230, the rod 225 may be rotated in the opposite direction to that used for securing the toolholder 10 so that the canister 200 is urged away from the toolholder support member 230. Since there may be an interference fit between the toolholder shank 45 and the toolholder support member 230, the toolholder 10 may not release from the toolholder support member 230 by merely moving the canister 200 into the toolholder shank 45, such that a retaining force is no longer applied by the locking elements 210.

For this reason the canister forward end 202 may include a canister bump-off 260 (FIG. 3) which contacts the toolholder impact area 120 and pushes the toolholder 10 from the toolholder support member 230 (FIG. 3). This is accomplished by continued rotation of the rod 225 past the position in which the locking elements 210 are recessed within the depressions 205 of the canister 200. In this manner, the mechanical advantage originally used to secure the toolholder 10 is now used to eject the toolholder 10. This is also illustrated in FIG. 4 where the canister bump-off 260 is shown contacting the toolholder impact area 120.

From inspection of FIG. 6, it should be apparent that access to the rod 225 is from the toolholder support member rearward end 234 and, when the toolholder support member 230 is secured to the base member 75, it is likely that there may be no access. Under these circumstances, changing the toolholder 210 requires removal of the toolholder support member 230 from the base member 75.

Figure 9:
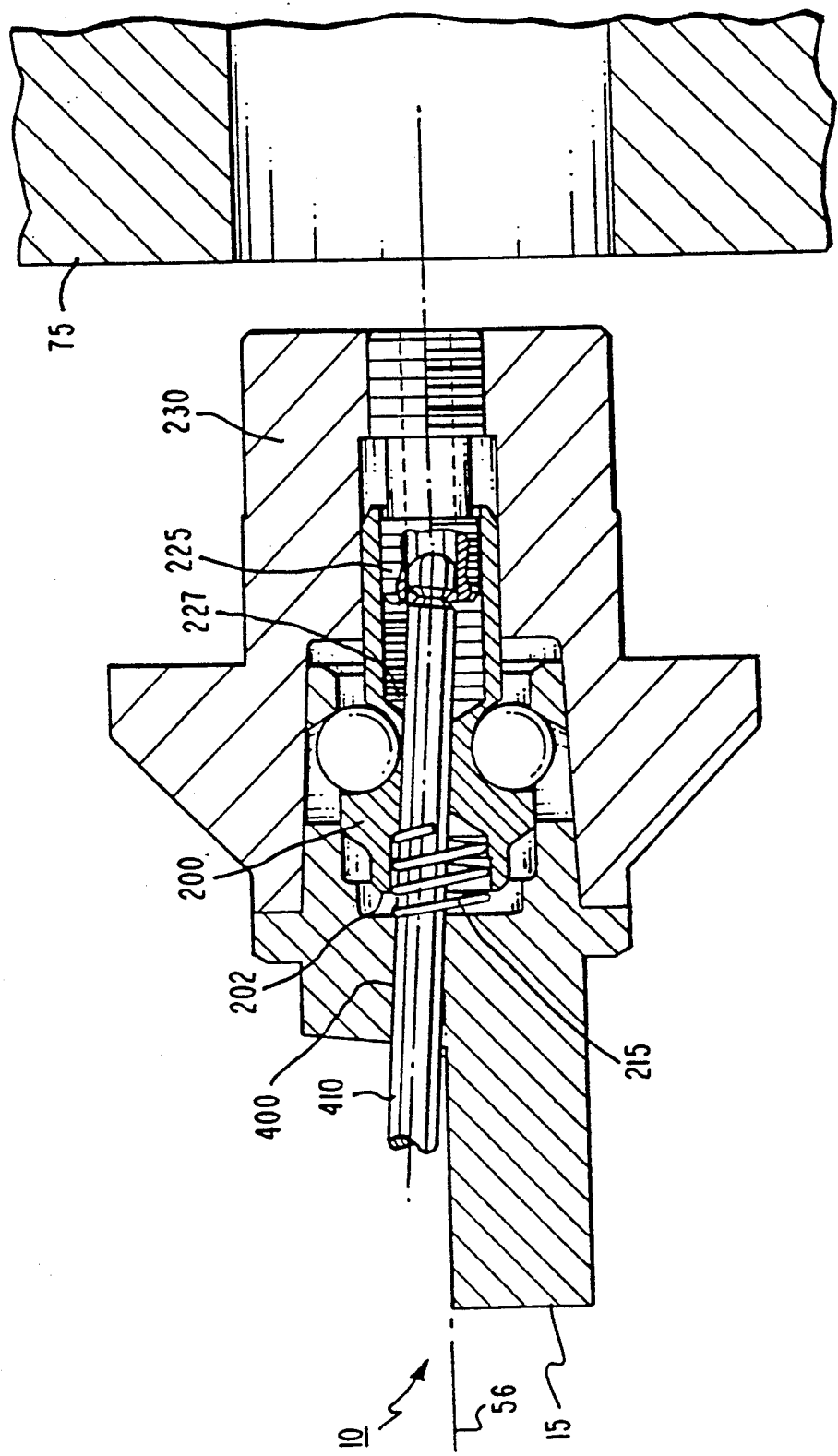
FIG. 9 shows the details of an embodiment of the apparatus in which access to the rod is from the forward end of the toolholder.

FIG. 9 illustrates an embodiment of the invention that provides access to the rod 225 through the canister forward end 202 thereby alleviating the need to remove the toolholder support member 230 from the base member 75 each time the toolholder 10 is to be changed. For clarity in FIG. 9, the cutting insert 20, shim 25, clamp 30 and pin 35 of the previous figures have been removed. On a conventional toolholder, the cutting insert occupies only a portion of the toolholder forward end 15 and therefore, there are areas on the toolholder foprward end 15 to accommodate a passageway 400 extending through the toolholder 10 and canister 200 to permit the introduction of a tool for engaging the rod forward end 227.

While other means for rotating the rod 225 may be available, one preferred embodiment requires a hexagonal cavity (not shown) within the rod forward end 227. In this manner a hex wrench 410 could be introduced through the passageway 400 to engage and rotate the rod 225.

Under these circumstances the passageway 400 should exists in the toolholder 10 and the canister 200 and be generally aligned between the toolholder an canister such that a tool 410 may be inserted for access to the rod 225. This may require a passageway 400 having an access which deviates from the longitudinal axis 56 of the toolholder 10. Under these circumstances a BALLDRIVER ® hex tool, which permits an angle entry to a hex cavity up to about 25 degrees from a longitudinal axis, may be used. BALLDRIVER is a registered trademark of the Bondhus Company for a hexagonal driver capable of imparting rotation from an off-axis orientation. Furthermore, it may be necessary to direct the passageway through the center of the spring 215.

While the means for urging the canister 200 into and out of the tool support member 230 has been described as a rod 225 having rod forward end threads 270 and rod rearward end threads 275 which engage the canister 200 and tool support member 230 respectively, it is possible to secure the canister 200 within the toolholder support member 230 in other ways.

One such way would involve securing the rod 225 directly to the canister 200 body and moving the rod 225 into or out of the toolholder support member opening 285 through other conventional means such as a nut (not shown) that could engage a portion of the rod 225 that may extend through the opening third portion 310 (FIG. 8) past the toolholder support member rearward end 234. In such a manner, the nut could be tightened to urge the canister 200 into the toolholder support member 230 to secure the toolholder 10 within the toolholder support member 230. To release the toolholder 10 from the toolholder support member 230 the nut could be loosened and the rod 225 pushed from the toolholder support member 230.

What has been described is an apparatus which acts as an adapter for mounting a quick change toolholder on a conventional machine tool without the need for an entire quick change system.

Changes and modifications in the specifically described embodiments of this apparatus can be carried out without department from the scope of the invention, which is intended to be limited only by the scope of the appended claims.

What is claimed is:

1. An apparatus to adapt a toolholder (10) for mounting to a base member (75) in which the toolholder (10) is designed for use with a quick release system and is comprised of a forward end (15) for receiving a tool (20), a rearwardly facing abutment face (40), a tubular shank (45) extending rearwardly away from said forward end (15) and having a longitudinal axis (56), said shank (45) perforated by perforations (55) at spaced locations, a forwardly facing concave contact surface (60) in each of said perforations (55), said forwardly facing concave contact surface (60) extending forwardly while extending away from the inner surface of said tubular shank (45) toward the outer surface of said tubular shank (45) and at least one slot (53) within said shank (45) by which said toolholder (10) may be held nonrotatably, said apparatus comprising:

a) adapter canister (200) capable of being inserted within the toolholder shank (45), said adapter canister (200) having:
      i) a forward end (202) and a rearward end (204);
      ii) depressions (205) located upon the canister (200) in positions corresponding to said perforations (55) such that in the inserted position the depressions (205) are generally aligned with said shank perforations (55); and
      iii) a protruding key portion (220) on the canister (200) for engaging said slot (53) within said shank (45) when said adapter canister (200) is inserted into said toolholder shank (45);
   b) a locking element (210) positioned within each perforation (55) and depression (205) to provide a coupling and to provide rigidity along the longitudinal axis (56) between said toolholder (10) and said adapter canister (200) by capturing said locking elements (210) between the respective depressions (205) and the toolholder perforation forwardly facing concave contact surfaces (60) when said adapter canister (200) is urged away from said toolholder (10);
   c) toolholder support member (230) having a forwardly facing abutment face (280) for contact with said toolholder rearwardly facing abutment face (40) and an opening (285) extending rearwardly therefrom to receive said toolholder (10) and said adapter canister (200) with said locking elements (210), said opening (285) having an opening first portion (290) to receive said shank (45), an opening second portion (300) to receive and hold nonrotatably said adapter canister (200) and an opening third portion (310) from which said toolholder (10) and said canister (200) with said locking elements (210) may be urged into said toolholder support member (230); and
   d) means for urging the canister (225) into and out of said toolholder support member (230).

2. The apparatus according to claim 1 wherein the means for urging said canister (225) into and out of said toolholder support member (230) is a rod (225) having a forward end (227) and a rearward end (229) with said forward end (227) secured to said adapter canister (200).

3. The apparatus according to claim 2 wherein the opening third portion (310) of said toolholder support member (230) is a threaded opening and the rod rearward end (229) is threaded for engagement within said threaded bore (315).

4. The apparatus according to claim 3 wherein said adapter canister (200) has a threaded bore (235) in said rearward end (204) and wherein said rod forward end (227) is matingly threaded for engagement with said threaded bore (235).

5. The apparatus according to claim 4 wherein the rod forward end (227) and rearward end (229) are threaded in the same hand but with different pitches such that the rod (225) rotation will cause relative movement between the canister (200) and the toolholder support member (230) in the same longitudinal direction.

6. The apparatus according to claim 5 wherein the thread pitch at the rod forward end (227) is approximately half of that of the rearward end (229).

7. The apparatus according to claim 4 wherein the rod (225) has at one end (227, 229) a means for being rotated.

8. The apparatus according to claim 7 wherein the rod means for being rotated is at the rod rearward end (229) and wherein the opening third portion (310) extends to the toolholder support member rearward end (234) thereby providing access to said means for being rotated.

9. The apparatus according to claim 7 wherein the rod means for being rotated is at the rod forward end (227) and wherein the toolholder (10) and the canister (200) each have a passageway (400) extending therethrough thereby providing access to said means for being rotated.

10. The apparatus according to claim 7 wherein the means for being rotated is a longitudinal bore within said rod (225) having the shape of an allen wrench at one end (227, 229) of said rod (225).

11. The apparatus according to claim 7 wherein means for being rotated is a screw head at one end (227, 229) of said rod (225).

12. The apparatus according to claim 2 wherein the canister forward end (202) abuts the toolholder (10) such that the canister when urged away from the toolholder support member (230) contacts the toolholder (10) and urges said toolholder (10) away from the toolholder support member (230).

13. The apparatus according to claim 12 wherein the canister (200) is biased away from the toolholder (10) by a spring contacting the canister forward end (202) and the toolholder (10).

14. The apparatus according to claim 1 wherein the opening first portion (290) is cylindrical and the toolholder shank (45) is cylindrical.

15. The apparatus according to claim 1 wherein the opening first portion (290) is conical and the toolholder shank (45) is conical.

16. The apparatus according to claim 1 wherein the opening second portion (300) is generally rectangular to engage the adapter canister protruding key portion (220).

17. The apparatus according to claim 1 wherein the locking elements (210) are spherical.

18. An apparatus to adapt a toolholder (10) for mounting to a base member (75) in which the toolholder (10) is designed for use with a quick release system and is comprised of a forward end (15) for receiving a tool (20), a rearwardly facing abutment face (40), a tubular shank (45) extending rearwardly away from said forward end (15) and having a longitudinal axis (56), said shank (45) perforated by perforations (55) at spaced locations, a forwardly facing concave contact surface (60) in each of said perforations (55), said forwardly facing concave contact surface (60) extending forwardly while extending away from the inner surface of said tubular shank (45) toward the outer surface of said tubular shank (45) and at least one slot (53) within said shank (45) by which said toolholder (10) may be held nonrotatably, said apparatus comprising
 a) an adapter canister (200) capable of being inserted within the toolholder shank (45), said adapter canister (200) having:
  i) a forward end (202) and a rearward end (204);
  ii) generally spherical depressions (205) located upon the canister (200) in positions corresponding to said perforations (55) such that in the inserted position the depressions (205) are generally aligned with said shank perforations (55);
  iii) a protruding key portion (220) on the canister (200) for engaging a slot (53) within said shank (45) when said adapter canister (200) is inserted into said toolholder shank (45);
 b) a spherical locking element (210) positioned within each perforation (55) and each depression (205) to provide a coupling and to provide rigidity along the longitudinal axis (56) between said toolholder (10) and said adapter canister (200) by capturing said locking elements (210) between said depression (205) and the toolholder forwardly facing concave contact surface (60) when said adapter canister (200) is urged away from said toolholder (10);
 c) a toolholder support member (230) having a forwardly facing abutment face (280) for contact with toolholder rearwardly facing abutment face (40) and an opening (285) extending rearwardly therefrom to receive said toolholder (10) and said adapter canister (200) with said locking elements (210), said opening (285) having an opening first portion (290) to receive said shank (45), an opening second portion (300) to receive and hold nonrotatably said adapter canister (200) and an opening third portion (310) from which toolholder (10) and canister (200) with locking elements (210) may be urged into said toolholder support member (230); and
 d) means for urging said canister (225) into and out of said toolholder support member (230) comprised of a rod (225) having a forward end (227) and a rearward end (229) wherein said rod (225) is threaded at each end (227, 229) and the rod forward end (227) is mateingly threaded in a threaded bore (235) within the canister rearward end (204) and the rod rearward end (229) is mateingly threaded in a threaded bore (235) with corresponding threads within opening third portion (310) of the toolholder support member (230) such that rod (225) rotation causes relative movement between the toolholder (10) and the toolholder support member (230) to secure or release the toolholder (10) from the toolholder support member (230).

* * * * *